July 7, 1931. E. A. SPERRY 1,812,994
BOREHOLE INCLINATION RECORDER
Filed Dec. 17, 1925   4 Sheets-Sheet 1
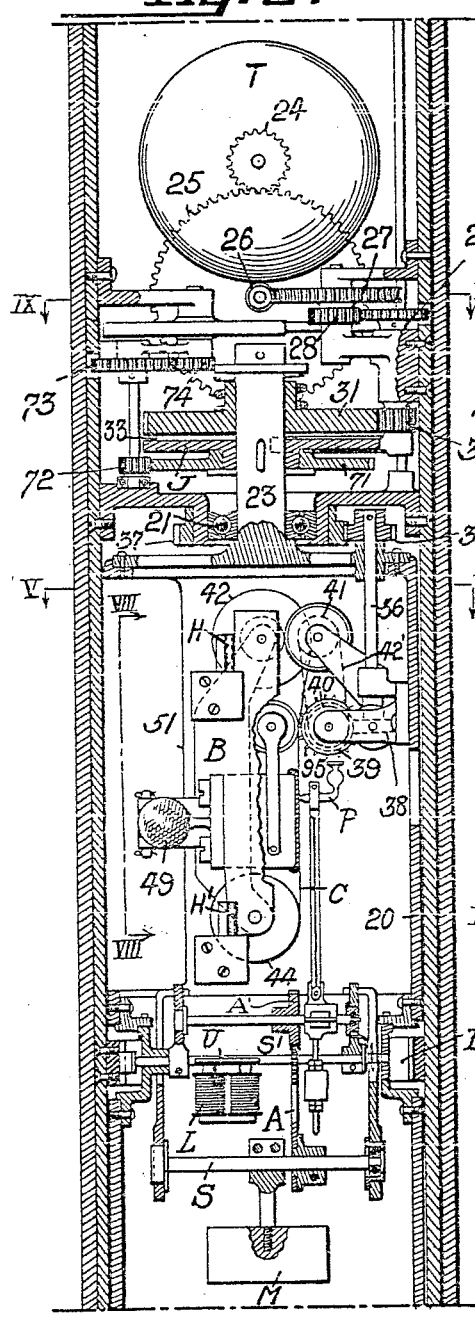
Inventor
Elmer A. Sperry.
By his Attorney
Herbert H. Thompson

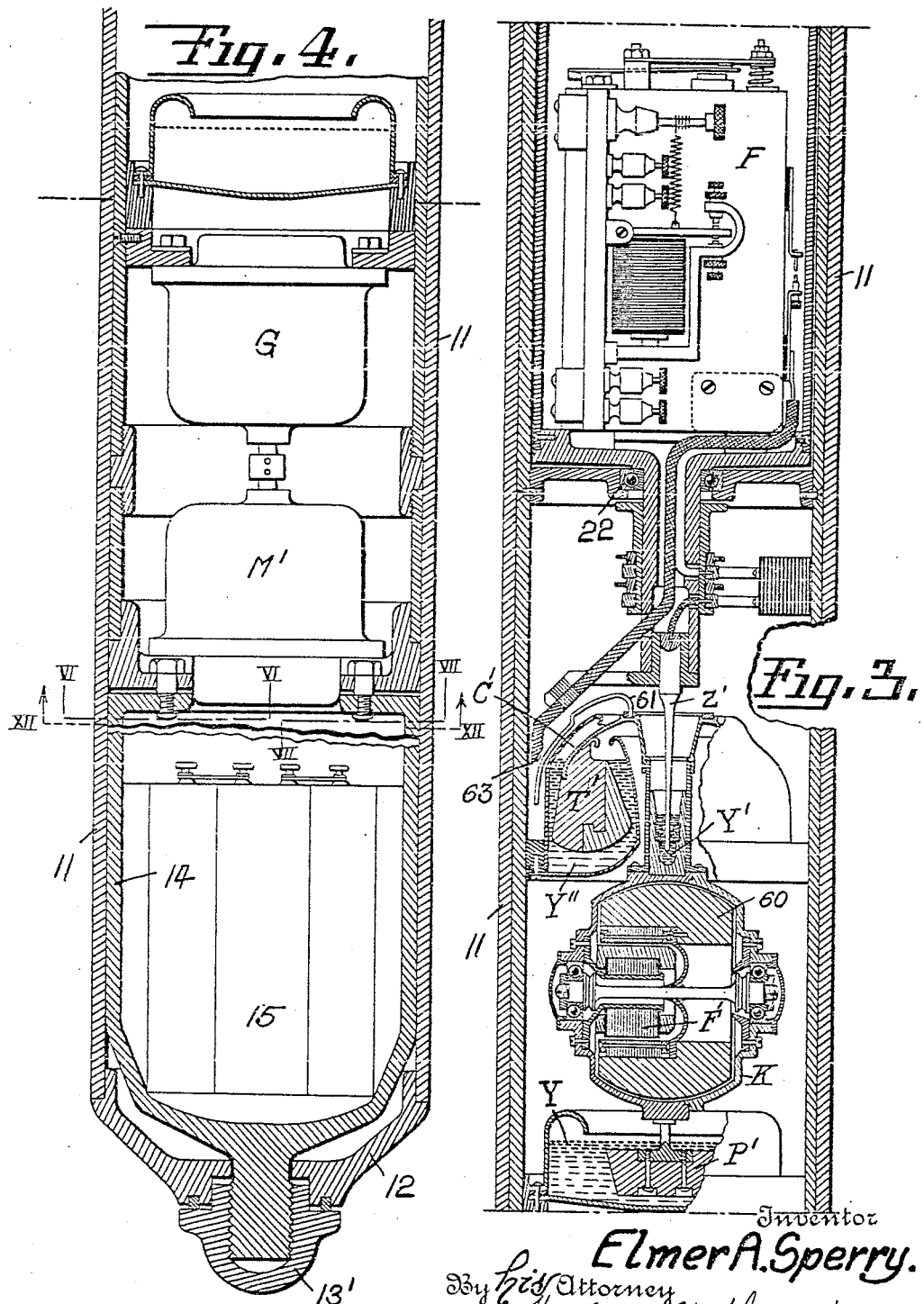

July 7, 1931.  E. A. SPERRY  1,812,994
BOREHOLE INCLINATION RECORDER
Filed Dec. 17, 1925   4 Sheets-Sheet 3
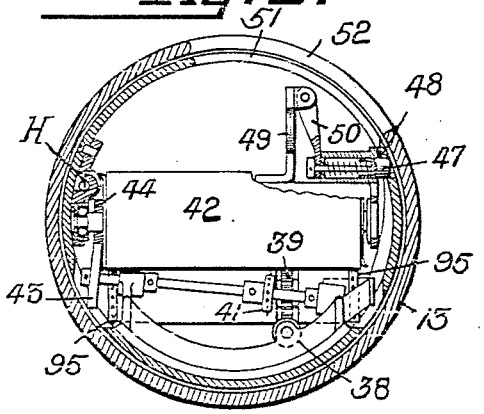
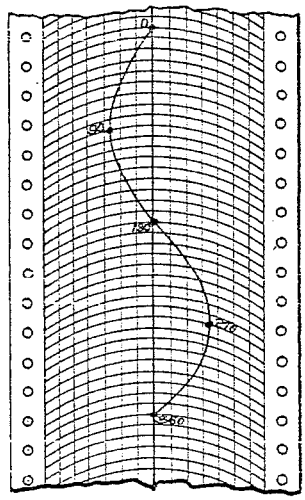
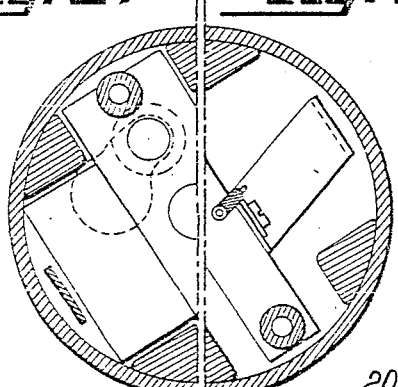
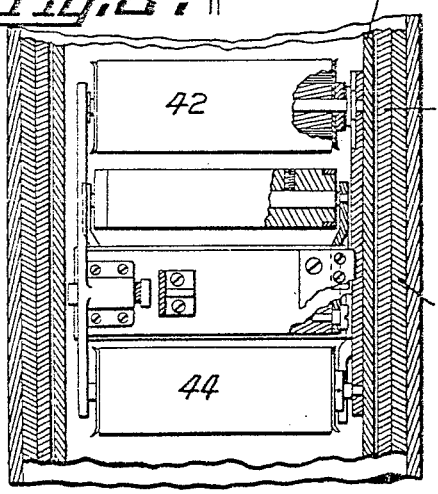
Inventor
Elmer A. Sperry.
By his Attorney
Herbert H. Thompson

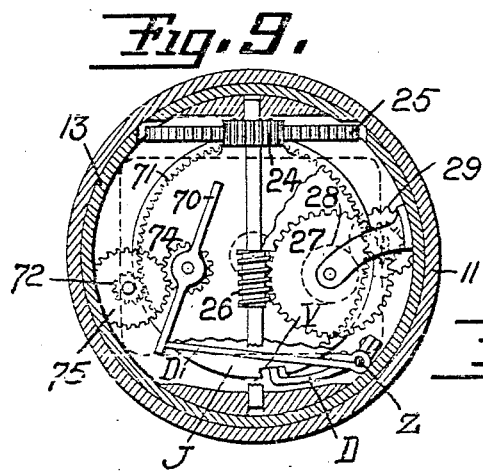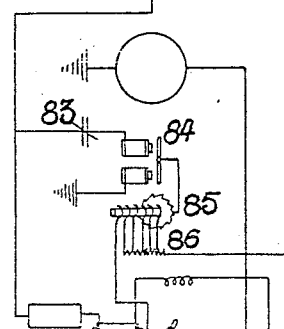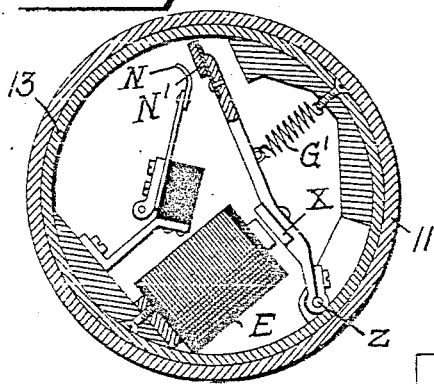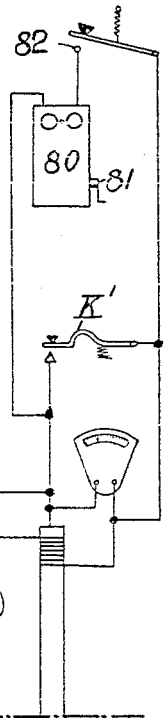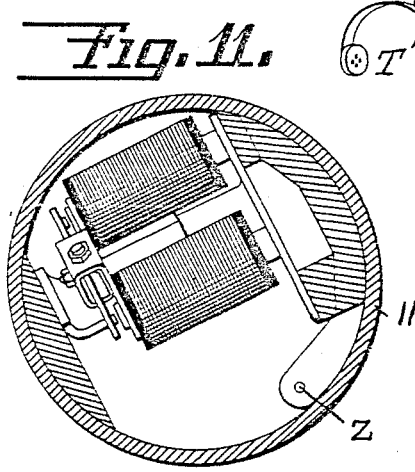

Patented July 7, 1931

1,812,994

UNITED STATES PATENT OFFICE

ELMER A. SPERRY, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

BOREHOLE INCLINATION RECORDER

Application filed December 17, 1925. Serial No. 75,931.

This invention relates to bore hole inclination recording apparatus and has for its principal objects the provision of a device of this kind which shall be in the form of a self-contained power plant and supported entirely by a single conductor cable, which is put to multiple use. It will be understood that a single cord cable can be used only in a case such as is presented by this invention, that is, where the indicating and recording device is a self-contained power plant and does not derive its power from an outside source from which the current would have to be conducted through the cord cable to the compass and recording device. The use of a single cord cable is simpler and reduces the expense of manufacturing such a device to within practical limits.

My invention has for a further object to provide a bore hole inclination recorder which is capable of giving upon a single record and with the use of but a single gravity control member an indication of inclination in any plane throughout a complete azimuth of 360°.

It is another object of this invention to provide indicating means as above with means for recording the exact geographic azimuth of the recorded inclinations. For this purpose there may be employed as part of the recording apparatus a compass, preferably a gyroscopic compass, driven by the self-contained power plant of the apparatus in conjunction with means for indicating upon the chart the geographic meridian or any other base line determined by the compass.

Further objects of my invention will be pointed out in the following detailed description thereof.

In the accompanying drawings,

Fig. 1 indicates a vertical section through the uppermost portion of my bore hole inclination recorder.

Fig. 2 is a vertical section through the next succeeding portion of said recorder below that of Fig. 1.

Fig. 3 is a vertical section through the portion of the recorder immediately below that of Fig. 2.

Fig. 4 represents a vertical section through the lowermost portion of the recorder below that of Fig. 3.

Fig. 5 is a section taken substantially on the line 5—5 of Fig. 2.

Fig. 6 is a section taken substantially on the line 6—6 of Fig. 4.

Fig. 7 is a section taken substantially on the line 7—7 of Fig. 4.

Fig. 8 is a front view, with parts broken away, of the recording mechanism of Fig. 2, taken substantially on line 8—8.

Fig. 9 is a section taken substantially on the line IX—IX of Fig. 2.

Fig. 10 is a section taken substantially on the line X—X of Fig. 1.

Fig. 11 is a section taken substantially on the line XI—XI of Fig. 1.

Fig. 12 is a wiring diagram of the portion of the control apparatus outside of the bore hole adapted to be actuated by an operator.

Fig. 13 is a wiring diagram of the bore hole inclination recording apparatus.

Fig. 14 is a portion of the recording chart.

Referring to the drawings, it will be observed that the entire bore hole inclination recording apparatus, indicated by the numeral 10, is contained within a single casing comprising the outer armor sheath 11 which has a detachable bottom cover 12 held in place by means such as a nut 13' so that when said cover is removed the interior mechanism of the recording apparatus may be withdrawn. Within armor casing 11 are two casings, indicated by the numerals 13 and 14, the former enclosing the recording device, compass and auxiliary parts, while the latter may contain the storage batteries 15 for supplying current to the various portions of the mechanism. The compartment 14 is below the casing 13 so that it may be withdrawn to permit new batteries to be inserted or the old batteries to be recharged without removing any of the other mechanism of the recording apparatus. The entire recording apparatus is suspended by a single cord cable 16, (i. e., having but a single conductor extending therethrough) and is, therefore, very inexpensive as compared with the multiple cord cable. The weight of the apparatus may be supported by the outer sheaths 17 of said cable.

It will be understood that the recording apparatus 10 is lowered within a pipe that lines the bore, this pipe being somewhat larger than the recording apparatus. If there is any inclination of the pipe, the lower end of the recorder will engage the side of the pipe while the upper end supported by the cable 16 will be removed from the side wall. In other words, the axis of the recording apparatus 10 will not coincide with the axis of the tube and an error indication would ordinarily occur. To obviate this condition, I provide at the upper end of recording apparatus 10 a solenoid 18 which may be energized by means, hereinafter to be described, by the operator at the control station on the ground level, when an indication is to be taken so that the upper end of said recording apparatus will be brought into engagement with the tube by the electro-magnet action to cause the entire recording apparatus to lie in contact with the inner wall of the tube. The carrying of current for the energization of the said coil 18 is one of the functions of the single cord cable 16.

When the recording apparatus is thus in position for recording any possible inclination of the bore hole, my recording device is adapted to be set into operation by the outside operator for giving an indication of inclination. Hitherto such means as two pendulums swinging in planes at right angles to each other have been employed for the purpose of indicating inclination in any plane. This resulted in a complicated structure, and obviously in certain planes the inclination could be determined only as a composite of the two records. I employ but a single pendulum and a single recording pen operating on one chart for giving at once a full and complete indication of inclination in any direction. For this purpose I provide means for rotating my recording device and controlling means therefor through a complete azimuth, that is, 360°. By calibrating the length of the traveling chart in degrees of azimuth and the width of the chart in degrees of inclination, as shown in Fig. 14, there is obtained, after rotating through 360°, a full and complete record of the inclination of the bore hole, i. e., the direction in azimuth of said inclination and the magnitude thereof. Thus, in Fig. 14, if zero degrees also indicates the geographic north, then obviously the bore hole has an inclination in the direction from 90 to 270 degrees azimuth, that is, from east to west, and the degree of inclination is indicated by the maximum deviation of the record from the central line.

To accomplish the object described in the above paragraph, I mount my recording device, which may comprise the traveling chart C, the recording pen P, and the pendulum M for controlling the pen P, upon a casing 20 within the casing 13 and supported in upper and lower bearings 21—22 so that the entire recording mechanism may be rotated by rotating shaft 23 to which casing 20 is connected. For rotating shaft 23, casing 20, and the recording means supported thereby, I may provide a motor T driving through gearing such as 24 to 31, the latter connected to shaft 23 through a friction clutch 33. By this means the casing 20, supporting the recording device, may be rotated through complete azimuths at desired and controllable intervals.

Preferably I cause the said rotation of casing 20 to drive the recording chart at a predetermined speed, taking the drive off a gear 35 at one end of the shaft 36 carried by the rotating casing 20 and meshing with a fixed gear 37. The proportion of gears 35 and 37 may be predetermined as well as gears 38—39 and sprocket wheels 40—41 connected by a chain 42' and toothed wheels 95 to give the proper rate of drive to the chart. The drive of the chart may be accomplished by the toothed wheels 95 on the shaft of gear 39 engaging in the chart C at the sides thereof and dragging said chart upwardly. The chart is guided over a rewind roll 42 which may be driven by a friction gearing 43—44 to permit a variable drive of the said rewind roll as the roll enlarges in diameter. The lower roll 44 may be the supply roll.

The entire chart-supporting mechanism including the lower supply roll and upper rewind roll may be supported upon a bracket B which is mounted on upper and lower hinges H—H' so that when a spring-pressed detent 47 is withdrawn from its groove 48 by pressing finger pieces 49 and 50 together, as shown in Fig. 5, the entire chart-supporting device may be swung about the hinges H—H' through an opening 51 in casing 20 and a corresponding opening 52 in casing 13 so that when the latter is withdrawn from the outer armor casing 11, the chart mechanism may be swung through openings 51 and 52 to permit a reading to be taken or to permit the chart to be replaced by a new roll. The hinges H—H' are such that the entire chart-supporting mechanism may be lifted off, out of engagement with the remaining apparatus.

The pen P operates across the face of the chart C laterally thereof when there is any inclination of the pendulum M about its axis. Said pendulum acts through segmental gear A fixed to the oscillating shaft S and meshing with pinion A' mounted on a shaft S'. As the casing 20 rotates, the shaft S' is caused to be operated axially to overcome static friction inertia by causing one end of said shaft to engage a ratchet ring R. R. fixed to the wall of casing 13.

It will now be apparent that as casing 20 is rotated, chart C will be driven at a predetermined rate per revolution and any inclination of the bore hole will cause pendulum M to operate pen P laterally across the chart. Obviously, if the pen is operated in one direction through half a revolution, it will be operated in the opposite direction through the remaining half revolution, if there is any inclination. If there is no inclination, pen P will merely trace a straight line down the center of the recording chart.

By reference to Fig. 14 it will be apparent that if the calibrations on the side of the chart could be related to a geographic meridian then the exact position of the inclination in azimuth could be determined. Thus, if the zero mark on the chart indicates north, then obviously the inclination, indicated by Fig. 14, is one running from 90° clockwise to 270° clockwise, in other words, an east-west inclination. Obviously the zero mark need not coincide with north although said zero mark should preferably be north, but any other calibration may be the north point equally well. For indicating on said chart the due north meridian, I may provide mechanism as follows: A compass K, which in this instance is a gyroscopic compass, comprising a rotor 60 adapted to be rotated at high velocity so that said compass will, by well known principles, set itself with its spinning axis in the geographic meridian. Fixed to the casing of said gyroscope may be a member 61 which may bear the relation to the compass of preferably a due north indication although any other predetermined indication may be utilized. Rotating with the rotatable casing 20 may be a conductor 63 so positioned as to form a gap when in juxtaposition with conductor 61, so that if current is supplied to said members 61—63, a spark will occur at that time and the current so obtained may be amplified by a Ford spark coil F to cause operation of a solenoid L which will attract its armature U connected to the shaft S' to cause actuation of the pen P. So that once for every revolution of casing 20 there will be generated a spark when the member 63 is in juxtaposition to the north pointing member 61 and the pen P will be momentarily operated to form a notch (not shown) in Fig. 14, which will then indicate north on the chart. Preferably the chart is so aligned that north coincides with the zero calibration thereof, but this is not necessarily so.

Storage batteries 15 may furnish the power which drive a D. C. motor M', which in turn drives an A. C. generator G which generates the current for driving the gyro compass and also for operating the motor T. The current for the gyro compass is preferably three-phase A. C. current and each of the three conductors is to be led to the sensitive unit and gyro through a mercury connection so that the sensitive element is free to find the meridian substantially without any restraining force being placed thereon. Thus, for example, one lead may enter the mercury cup Y into which dips a float P' fixed to the gyro casing K for damping purposes and support, in that manner leading one phase of the current to the gyro field F'. A second lead may enter through a guiding and centralizing member Z' dipping into a mercury cup Y' insulated from the casing K. The third lead may be connected to mercury cup Y'' into which dips a float T' having a conducting member C' connected thereto, said conducting member carrying the third phase of the current to the gyro field F'.

The device is adapted to be under complete control of the distant operator and preferably the casing 20 does not rotate continuously but only when the operator desires that a record be made and then preferably the casing 20 rotates for only a single revolution and the chart C is moved through a distance corresponding to only one azimuth of 360°. To permit such starting and stopping of the device for the actuation thus described, I may provide within the recording device an electro-magnet E (Fig. 10) controlled by a circuit closer, such as a telegraph key K', adapted to be actuated by the operator so that when said key K' is depressed to close the circuit through magnet E, an armature X is attracted to cause contacts N—N' to engage and close the circuit through motor M and at the same time energize solenoid 18 (Fig. 1) to cause the recording device to engage firmly the wall of the bore tube. Closing said circuit may also be caused to energize the relay F (Fig. 3) for intensifying the current that operates magnet L (Fig. 2). When key K' is depressed and the magnet E attracts armature X, shaft Z, to which said armature is connected, is rotated (see Figs. 9 and 10) to cause a detent D to be withdrawn from a groove V in a disc J fixed to shaft 23 thereby permitting motor T to rotate shaft 23 and hence casing 20, in azimuth, this resulting in the feeding of chart C. By means of a telephone earpiece T', the operator may hear when the motor T commences to rotate and thereafter may release key K'. This, however, does not result in armature X being released to open the circuit at N—N' to break the circuit through the motor T because detent D is now riding upon the periphery of disc J and shaft Z is, therefore, held in actuated position until the disc J has made a complete revolution, whereupon the detent D drops into groove V and armature X is pulled back by its spring G' to break the circuit through the motor T at N—N'. To prevent jamming of detent D against the forward edge of groove V which would make it difficult to withdraw the detent from said groove upon another actuation of the device, means are provided for stopping disc J before the detent D has engaged the end of groove V. For this purpose a second detent D', fixed to shaft Z, may be employed adapted to engage, when detent D drops into groove V, a flag member 70 geared to be driven by the motor T through the gearing 71 to 74 from the driven side of the friction clutch 33 at high velocity. While shaft Z is in its actuated position and detent D is riding on the periphery of disc J, detent D' is free of flag 70 which rotates then at high speed. As soon as detent D drops into groove V and before it reaches the end of said groove, detent D' engages flag 70 to cause immediate stopping of movement of disc J. The stored up inertia of the motor T is taken up by slipping of the friction clutch 33 until said motor reaches the end of its movement.

Means may be provided for controlling the speeding-up of the motor generator set so that it can be done gradually to pick up the spinning of the gyro with it during the acceleration period of both. For this purpose there may be provided a magneto 80 (Fig. 12) at the operator's station which may be operated by a hand-wheel 81 when the circuit closer 82 is operated to closed position to transmit current by the one cord cable to the condenser 83 and thence to a buzzer mechanism 84 which may be caused to operate a ratchet 85, the degree of operation of the latter determining the amount of resistance 86 to be cut out of the motor generator circuit. The resistance can be cut out, therefore, as gradually as desired to cause the spinning-up of said motor generator to be synchronized with the spinning-up of the gyro compass.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A bore-hole inclination recorder including means responsive to inclination, means actuated by said first means for recording said inclination, and a self-contained electric power plant within said recorder for operating the same.

2. A bore-hole inclination recorder including means responsive to inclination, means actuated by said first means for recording said inclination, a self-contained electric power plant within said recorder for operating the same and a one-cord cable suspension for said casing.

3. In a bore-hole inclination recorder, in combination, a single chart, means for indicating upon said chart the degree of inclination and the azimuth of said inclination, and means for indicating upon said chart the geographic meridian.

4. A bore-hole inclination recorder comprising means responsive to inclination, means actuated by said first means for recording said inclination, and means for rotating said first two means in azimuth.

5. A bore-hole inclination recorder comprising means responsive to inclination, a chart, means for moving said chart, means actuated by said first means for recording said inclination upon said chart, and means for rotating said first two means in azimuth, said chart being calibrated in azimuth and inclination as coordinates.

6. A bore-hole inclination recorder comprising means responsive to inclination, a chart, means for moving said chart, means actuated by said first means for recording said inclination upon said chart, and means for rotating said first two means in azimuth, said chart being calibrated in azimuth in the direction of travel of the chart and in inclination laterally thereof.

7. In a bore-hole inclination recorder, in combination, a single chart, means for moving said chart, means for indicating upon said chart the degree of inclination and the azimuth of said inclination, and means for periodically indicating upon said chart the geographic meridian.

8. A bore-hole inclination recorder comprising means responsive to inclination, a chart, means for moving said chart, means actuated by said first means for recording said inclination upon said chart, means for rotating said first two means in azimuth, said chart being calibrated in azimuth and in inclination as coordinates, and means for indicating upon said chart the geographic meridian.

9. A bore-hole inclination recorder comprising means responsive to inclination, a chart, means for moving said chart, means actuated by said first means for recording said inclination upon said chart, means for rotating said first two means in azimuth, said chart being calibrated in azimuth in the direction of travel of the chart and in inclination laterally thereof, and means for indicating the geographic meridian upon said chart at intervals corresponding to 360° in azimuth.

10. A bore-hole inclination recorder comprising means responsive to inclination, a traveling chart, means actuated by said first means for recording said inclination upon said chart, means for rotating said first two means in azimuth, said chart being calibrated in azimuth in the direction of travel of the chart and in inclination laterally thereof, and means for periodically indicating upon said chart the geographic meridian, said last-named means including a compass, and means controlled jointly by said rotating means and said compass when in predetermined relation for actuating said recording means.

11. A bore-hole inclination recorder comprising means responsive to inclination, a traveling chart, means actuated by said first means for recording said inclination upon said chart, means for rotating said first two means in azimuth, said chart being calibrated in azimuth in the direction of travel of the chart and in inclination laterally thereof, and means for periodically indicating upon said chart the geographic meridian, said last-named means including a compass, a sparking mechanism including one contact carried by said rotating means and the other contact by said compass to cause a flow of current when said contacts are in predetermined relation, and means whereby said flow of current actuates said recording means.

12. A bore-hole inclination recorder comprising means responsive to inclination, a traveling chart, means actuated by said first means for recording said inclination upon said chart, means for rotating said first two means in azimuth, said chart being calibrated in azimuth and in inclination as coordinates, and means for gearing together said chart and said rotating means to move said chart at a predetermined rate relative to the rotation of said first two means.

13. A bore-hole inclination recorder comprising means responsive to inclination, a traveling chart, means actuated by said first means for recording said inclination upon said chart, means for rotating said first two means in azimuth, said chart being calibrated in azimuth and in inclination as coordinates, means normally rendering said rotating means ineffective, and distant-controlled means for rendering said last-named means ineffective and said rotating means effective.

14. A bore-hole inclination recorder comprising means responsive to inclination, a traveling chart, means actuated by said first means for recording said inclination upon said chart, means for rotating said first two means in azimuth, said chart being calibrated in azimuth and in inclination as coordinates, distant-controlled means for rendering said rotating means effective, and means whereby said rotating means is automatically rendered ineffective when said first two means have been rotated through 360° in azimuth.

15. A bore-hole inclination recorder comprising means responsive to inclination, a traveling chart, means actuated by said first means for recording said inclination upon said chart, means for rotating said first two means in azimuth, said chart being calibrated in azimuth and in inclination as coordinates, distant-controlled means for rendering said rotation means effective, and means whereby said rotating means is automatically rendered ineffective when said first two means have been rotated through 360° in azimuth, said last-named means including a disc connected to said first two means and operable by said rotating means, said disc having a peripheral groove, and a detent controlled by said distant control means and cooperating with said groove and the periphery of said disc.

16. A bore-hole inclination recorder comprising means responsive to inclination, a traveling chart, means actuated by said first means for recording said inclination upon said chart, means for rotating said first two means in azimuth, said chart being calibrated in azimuth and in inclination as coordinates, distant-controlled means for rendering said rotating means effective, means whereby said rotating means is automatically rendered ineffective when said first two means have been rotated through 360° in azimuth, and a friction clutch between said first two means and said rotating means.

17. A bore-hole inclination recorder comprising means responsive to inclination, a traveling chart, means actuated by said first means for recording said inclination upon said chart, means for rotating said first two means in aximuth, said chart being calibrated in azimuth and in inclination as coordinates, distant-controlled means for rendering said rotating means effective, and means whereby said rotating means is automatically rendered ineffective when said first two means have been rotated through 360° in azimuth, said last-named means including a disc connected to said first two means and operable by said rotating means, said disc having a peripheral groove, a detent controlled by said distant control means and cooperating with said groove and the periphery of said disc, and a friction clutch between said disc and said rotating means.

18. A bore-hole inclination recorder comprising a casing, inclination-responsive means and inclination-recording means in said casing, an electric power plant including a battery unit for said recorder, and a cell for said unit detachably enclosed in said casing.

19. A bore-hole inclination recorder comprising a casing, inclination-responsive means and inclination-recording means in said casing, an electric power plant including a battery unit for said recorder, and a cell for said unit enclosed in said casing adjacent one end thereof, said casing having a detachable closure on said end to permit withdrawal of said cell.

20. A bore-hole inclination recorder comprising means responsive to inclination, a traveling chart, means actuated by said first means for recording said inclination upon said chart, means for rotating said first two means in azimuth, said chart being calibrated in azimuth in the direction of travel of the chart and in inclination laterally thereof, means including an electrically-driven gyroscopic compass for indicating upon said chart the geographic meridian, and a self-contained electric power plant for operating said rotating means and said compass.

21. A bore-hole inclination recorder comprising a casing, said casing containing means responsive to inclination, means actuated by said first means for recording said inclination, a self-contained electric power plant for operating the recorder, and means within said casing adapted to be controlled from a distance for controlling the rate of operation of said power plant.

22. A bore-hole inclination recorder comprising a casing, said casing containing means responsive to inclination, means actuated by said first means for recording said inclination, a self-contained electric power plant for operating the recorder, a rheostat for controlling the rate of operation of said power plant, and means outside said casing and removed therefrom for controlling said rheostat.

23. A bore-hole inclination recorder comprising means responsive to inclination, a traveling chart, means actuated by said first means for recording said inclination upon said chart, means for rotating said first two means in azimuth, said chart being calibrated in azimuth in the direction of travel of the chart and in inclination laterally thereof, means including an electrically-driven gyroscopic compass for indicating upon said chart the geographic meridian, a self-contained electric power plant including storage batteries and a motor-generator unit for operating said rotating means and said compass, and a telephone receiver in the electric circuit of said power plant and compass.

In testimony whereof I have affixed my signature.

ELMER A. SPERRY.